United States Patent [19]

Biles

[11] 4,096,846
[45] Jun. 27, 1978

[54] ROTARY FLUID PRESSURE ENGINE

[76] Inventor: Alfred Biles, 74809 Sunset Dr., Twenty-Nine Palms, Calif. 92277

[21] Appl. No.: 687,381

[22] Filed: May 17, 1976

Related U.S. Application Data

[63] Continuation-in-part of Ser. No. 503,837, Sep. 6, 1974, abandoned.

[51] Int. Cl.² ............................................. F02B 53/00
[52] U.S. Cl. .................................... 123/228; 418/222
[58] Field of Search ............................ 123/8.27, 8.31; 418/217, 222

[56] References Cited

U.S. PATENT DOCUMENTS

| 2,172,039 | 9/1939 | Shore | 123/8.27 |
|---|---|---|---|
| 2,371,514 | 3/1945 | Gold et al. | 123/8.27 |
| 2,468,451 | 4/1949 | Kutzner | 123/8.31 X |
| 2,690,166 | 9/1954 | Shore | 123/8.31 |
| 3,799,127 | 3/1974 | Tseng | 123/8.27 |

FOREIGN PATENT DOCUMENTS

| 1,503,337 | 12/1971 | Germany | 418/217 |
|---|---|---|---|
| 265,220 | 11/1927 | United Kingdom | 123/8.27 |

Primary Examiner—Carlton R. Croyle
Assistant Examiner—Michael Koczo, Jr.
Attorney, Agent, or Firm—Harvey S. Hertz

[57] ABSTRACT

A rotary fluid pressure engine having good fuel efficiency and low pollutant emissions. An annnular chamber of uniform cross-section forms a cylinder housing. An endless rotor is centrally positioned and movable in the cylinder housing. The rotor comprises at least one uniform thickness and height section which is connected to at least one enlarged height piston section, the rotor central width being approximately equal to the central width of the cylinder housing. At least one air floating valve member is formed in the cylinder housing, the valve members being movable by the enlarged height rotor section. The engine can be utilized to provide a compressed air source; to operate as a fluid pump; or utilized to turn a shaft.

9 Claims, 11 Drawing Figures

ROTARY FLUID PRESSURE ENGINE

The present invention is a continuation-inpart of U.S. Pat. application No. 503,837, filed Sept. 6, 1974, and now abandoned.

FIELD OF THE INVENTION

The field of art to which the invention pertains includes the field of rotary fluid pressure engines, particularly with respect to an endless rotor engine.

BACKGROUND AND SUMMARY OF THE INVENTION

It is well known that engines lose efficiency by transmitting fluid pressure by means of cranks and connecting rods, by not providing full expansion of compressed gas, by loss of reciprocal momentum, by friction resulting from side pressure, from excessive number of moving parts and by excessive weight and bulk. These inefficiencies result in excess comsumption of fuel with consequent excess pollution of the environment. It is also well known that a rotary internal combustion engine, wherein combustion occurs in an expanding chamber, does not detonate or produce the resultant high pressure and temperature as occurs in the reciprocating piston type engine and, therefore, forms less carbon monoxide and nitrous oxides and requires no lead or other fuel additive to control detonation.

Known prior art includes U.S. Pat. Nos. 890,793; 974,913; 1,014,378; 1,220,594; 1,406,503; 2,069,557; 3,213,759; and 3,769,945.

The present invention provides a highly efficient rotary fluid pressure engine with minimum space and mass requirements. The internal combustion engine has low pollutant emission levels. Engine efficiency is increased by elimination of cranks and piston rods. A minimum of energy is lost by exhaust heat and pressure. The noise level is low. Energy can be stored in the form of compressed air, enabling the engine to run only as needed and only at its most efficient and economical constant speed. Friction loss is minimized by extreme simplifications and by floating all moving parts on an air bed.

The valve members divide the cylinder into chambers through which the pistons on the rotor pass when rotating, opening the valves in passing from chamber to chamber. There is an exhaust port on the approach side of each valve and an intake port on the other side of the valve. There are also slots through the rotor on both sides of the piston to equalize pressure in the two halves of the chamber on opposite sides of the rotor. Combustion or other fluid pressure between the valve and the piston turns the rotor. The other side of the piston pushes out combustion exhaust against the next valve, or pumps liquid, or compresses air, air/fuel mix, or other gas through the exhaust port. The distance the piston travels in each chamber and the number and function of chambers in a cylinder can vary in accordance with the purpose of a particular engine design. For internal combustion, there must be an external fuel source, means for mixing the fuel with air before or after compression, and means for igniting the compressed air/fuel mixture. The same engine can compress additional air into an external receiver and also use such external compressed air to start the engine by reversing the flow through the intake/compression chamber(s), thus making unnecessary an external starter, starting motor and battery. An external compressed air source will be required to start the engine initially, or whenever pressure drops below starting minimum.

The same engine without provision for internal combustion can utilize the compressed air or other external fluid pressure, such as steam, to rotate vehicle wheels about the axles, thereby eliminating the need for shafting, gears, and clutch; and such an engine can be used to generate electricity, whether or not the compressing engine is running.

The availability of compressed air provides means for holding valve members against the rotor, for forcing lubricating oil to all moving parts, for pumping fuel to the carburetor, and for controlling automatically the starting and stopping of the compressing engine. The heat of compression is available for external use and the cold of expansion is available for cooling the engine and other external uses.

Only one version of an internal combustion engine is shown in the drawings. The combustion/exhaust chambers have been extended to provide complete expansion to atmospheric temperature and pressure and the intake/compression chambers are the same length to provide additional compressed air both for combustion and for external storage.

Particularly, the engine comprises an annular chamber of uniform cross-section forming a cylinder housing. A free floating endless rotor is centrally positioned in and movable in the cylinder housing. The central width of the rotor is approximately equal to the central width of the cylinder housing. The rotor contains at least one uniform thickness height section which is connected to at least one enlarged height piston section. At least one valve member is formed in the cylinder housing, the valve members being movable by the enlarged height section.

DESCRIPTION OF THE PREFERRED EMBODIMENTS

Figure 1:
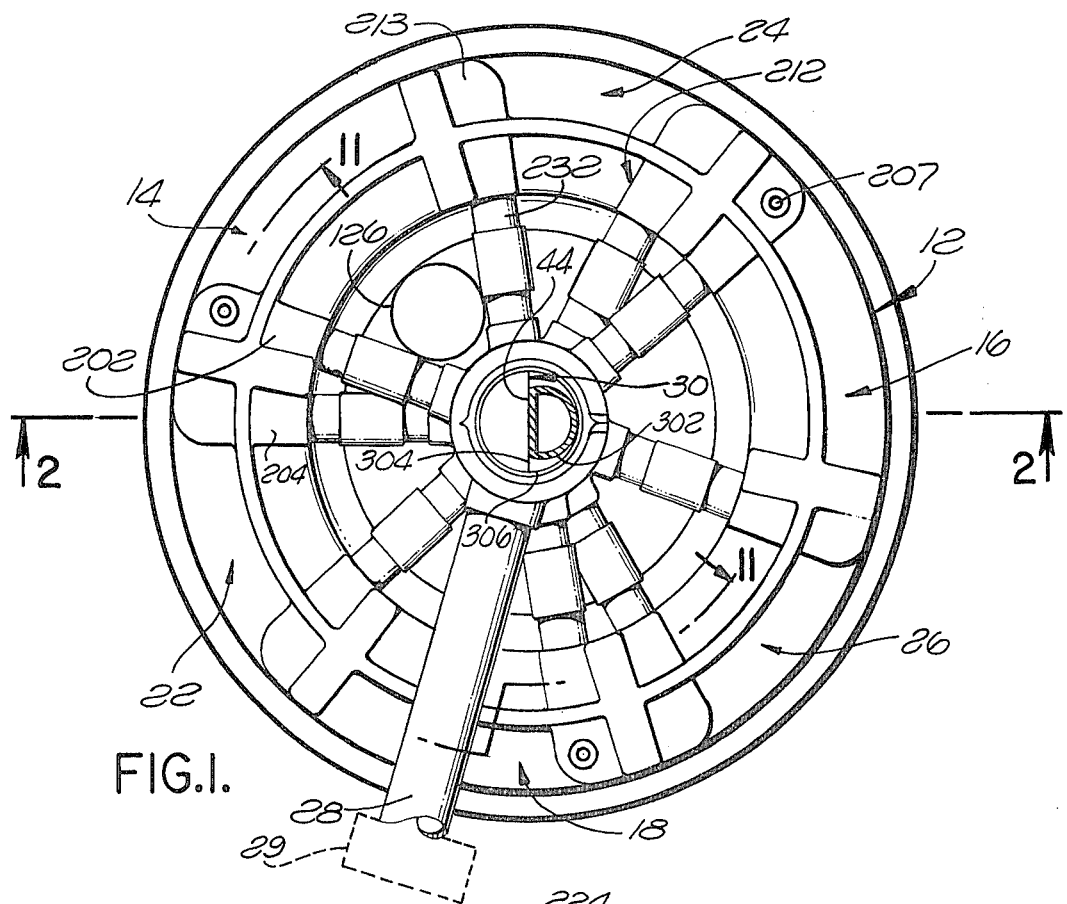
FIG. 1 is a top view, partly in section, of the rotary fluid pressure engine.

Referring now to the drawings, there is shown in FIG. 1, a rotary engine constructed in accordance with principles of the invention. The engine contains a generally cylindrical housing 12 having a plurality of combustion exhaust chambers 14, 16 and 18. The engine further comprises a plurality of compression/intake chambers 22, 24 and 26, which are interspaced evenly between the combustion exhaust chambers. The rotary engine combustion exhaust chambers 14, 16 and 18 are each spaced 120 degrees apart, with the compression intake chambers 22, 24 and 26 also spaced 120 degrees apart and intermediate the combustion exhaust chambers. It should be understood, of course, that more or less combustion exhaust chambers could be utilized, the spacing therebetween being equal as shown in FIG. 1 although other arrangements are possible as will be explained hereinafter. The rotary engine of FIG. 1 is connected to a source of compressed air 29 by an external outlet 28 joined to a control valve central cylinder 30 of the rotary engine. The central cylinder 30 is divided by a plate 302 at a first compartment 304 and a second compartment 306.

Figure 2:
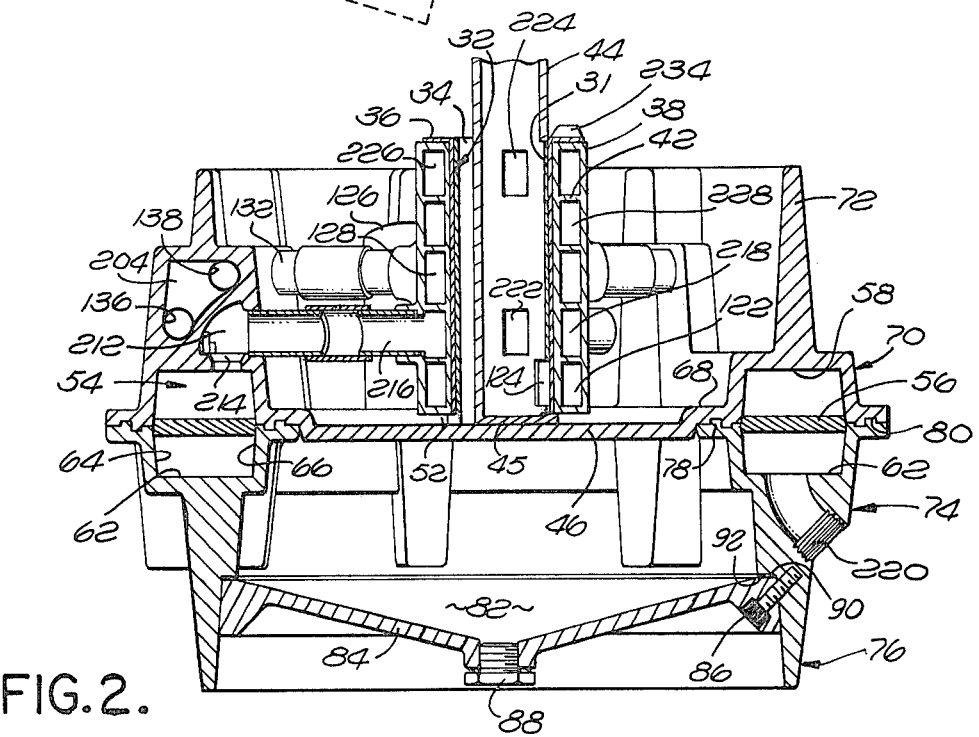
FIG. 2 is a sectional side view of the engine of FIG. 1 taken along the line 2—2 thereof.

Referring now to FIG. 2, the control valve central cylinder 30 is surrounded by an intermediate rotatable cylinder 32. A flange pointer 36 extends outwardly from the upper end of the rotatable cylinder 32 in a plane perpendicular to the central cylinder 30 axis. The flange 36 is positioned on the top wall of an outer fixed distribution cylinder 38. The cylinder 38 is formed of a plurality of annular cavities stacked in vertical planes and separated by thin walls 42. The annular cavities will be described in greater detail hereinafter.

A compressed air pipe 44 forms an upper continuation of the cylinder 30 second compartment 306. The other end of the pipe 44 is connected to a compressed air manifold (not shown). Air can be maintained in the manifold at a constant pressure in the compressed air manifold by a pressure regulator coupled to the source of compressed air 29.

The first compartment 304 is open at its top 34 to form a fresh air inlet. A bottom wall 45 of the cylinder second compartment 304 terminates on a housing central mounting plate 46. A gap 52 defines a second air inlet at the bottom of the compartment 306.

An annular cavity 54 is formed around the central periphery of the rotary engine and provides a path of travel for a rotor 56. The annular cavity 54 is defined by a top wall 58 and a bottom wall 62 parallel thereto which are joined by a pair of spaced apart and oppositely bowed outer and inner side walls 64 and 66, respectively. At the center of the cavity 54, the maximum separation between the outer side wall 64 and the inner side wall 66 is slightly greater than the width of the rotor 56 enabling the rotor to rotate with respect to the cavity 54.

The annular cavity 54 is formed of cast metal halves with the central mounting plate 46 forming an extension 68 of the cylinder top half 70. A cooling fin 72 extends from the cavity top wall around the motor to stiffen the cylinder and dissipate heat generated therein. The bottom half of the cavity 54 is also defined by a cast metal half 74. A second stiffening and cooling fin 76 extends from the lower side of the bottom half 74 of the annular cavity 54. The chamber cast halves 70 and 74 are interconnected by tongue and groove arrangements 78 and 80 adjacent the chamber side walls 66 and 64 respectively, allowing expansion and contraction of the cast metal halves. In addition, periodically spaced bolts (not shown) are utilized to secure the chamber halves together.

An oil sump 82 is formed below and is covered by the lower side of the central mounting plate 46. A sump pan 84 is secured by means of bolts 86 to the second cooling fin 76 interior surface. A drain plug 88 enables the oil to be drained from the sump 82 when it becomes necessary to change the engine lubrication oil. A gasket 90 is positioned between the pan 84 and the fin 76 shoulder 92. An oil hole in the mounting plate 46, a dip stick and oil pump can also be provided (not shown).

Figure 3:
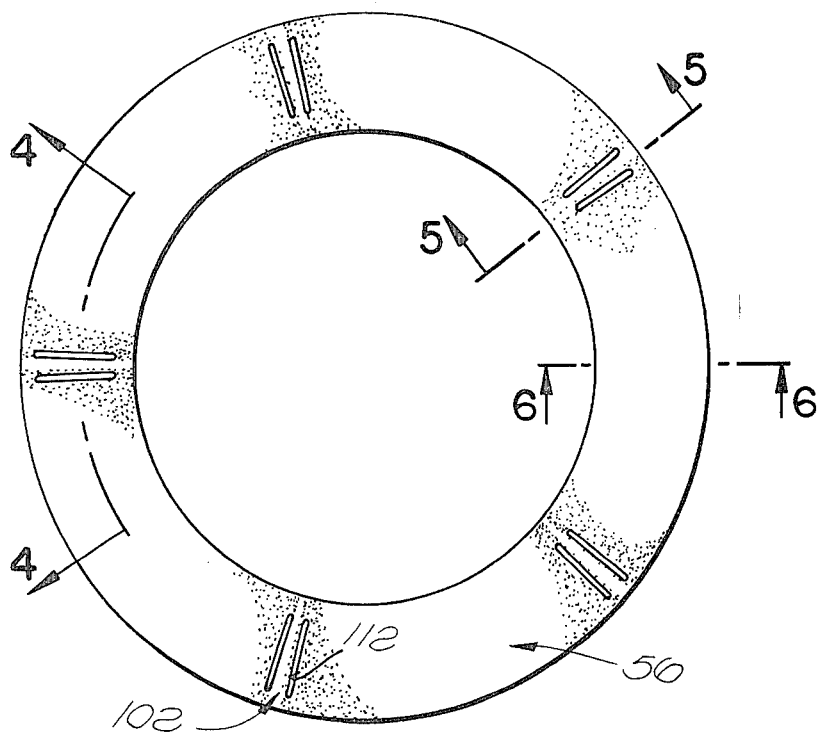
FIG. 3 is a top plan view of the rotor used in the engine of FIG. 1.
Figure 4:
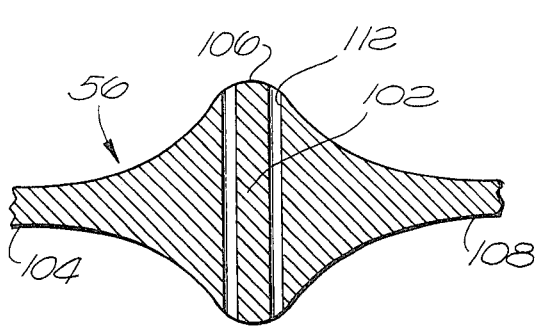
FIG. 4 is a view in section of the rotor of FIG. 3 taken along the line 4—4 thereof.
Figure 5:
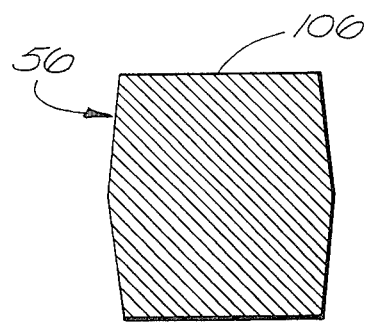
FIG. 5 is a view in section of the maximum cross-section of the rotor of FIG. 3 taken along the line 5—5 thereof.
Figure 6:
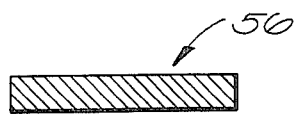
FIG. 6 is a view in section of the minimum cross-section of the rotor of FIG. 3 taken along the line 6—6 thereof.

Referring now to FIG. 3, there is illustrated a top view of the rotor 56. As viewed in FIG. 3, the rotor is an annular ring and contains five enlarged height sections 102. The sections 102 are equally spaced at 72 degree intervals around the rotor. As can be seen in FIG. 4, the rotor ring tapers from a minimum height point 104 to a maximum height point 106 and then back to a minimum height point 108. At the maximum height point 106, the rotor cross-section (FIG. 5) has a minimum clearance with the cavity 54 to allow the rotor to float in its air bed and rotate freely with a minimum of friction. FIG. 6 illustrates the rotor crosssection at the minimum height points 104 and 108. The shape of the cavity 54 and rotor 56 is normally chosen for ease of casting and machining but other curved or rectangular shapes could be used as well.

Transversely extending slots 112 are formed on opposite sides of the maximum height point 106 for enabling combustible gases as well as compressed air to be displaced from the top surface of the rotor to the bottom surface. In addition, it should be noted that the cylindrical housing 12 contains three compression intake chambers and three combustion exhaust chambers whereas the rotor 56 contains five enlarge height sections. While other arrangements are possible, the use of an odd number of enlarged height sections with respect to an even number of chambers prevents simultaneous combustion.

Referring again to FIG. 2, compressed air is transferred through the compressed air pipe 44 to a lower annular cavity 122 of the cylindrical distribution chamber 38 through aligned apertures designed generally as 124 in the second compartment 306, the intermediate rotatable cylinder 32 and the outer distribution cylinder 38. The lower annular cavity 122 in turn is connected (not shown) to the engine carburetor 126 (FIG. 1) secured to the central mounting plate 46. The carburetor 126 mixes a fuel source (not shown) with the compressed air. The carburetor air-fuel mixture output is coupled to the distribution chamber central annular cavity 128.

Figure 10:
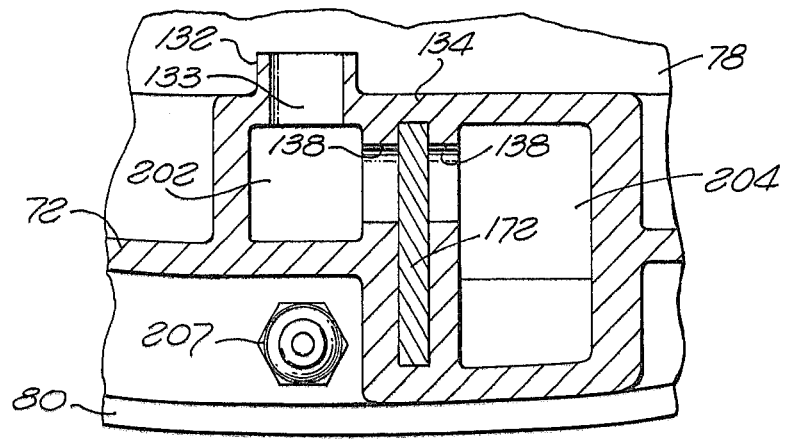
FIG. 10 is a top view, partly in section, of the delayed combustion chamber taken along the line 10—10 of FIG. 8.
Figure 11:
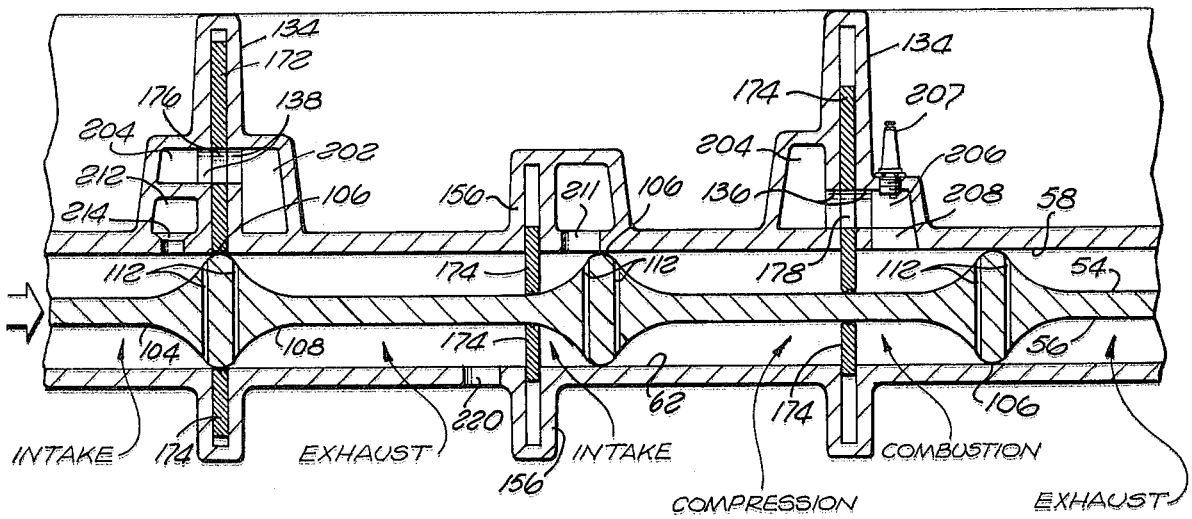
FIG. 11 is a partial cross-sectional view of the engine taken along the line 11—11 of FIG. 1.

As shown in FIGS. 10 and 11, apertures (not shown) in the central annular cavity 128 are coupled through feed lines 132 to an intake chamber 202, a port 176, a delay chamber 204, a port 178, and a port 208 in each of the combustion/exhaust chambers 14, 16, or 18.

Figure 7:
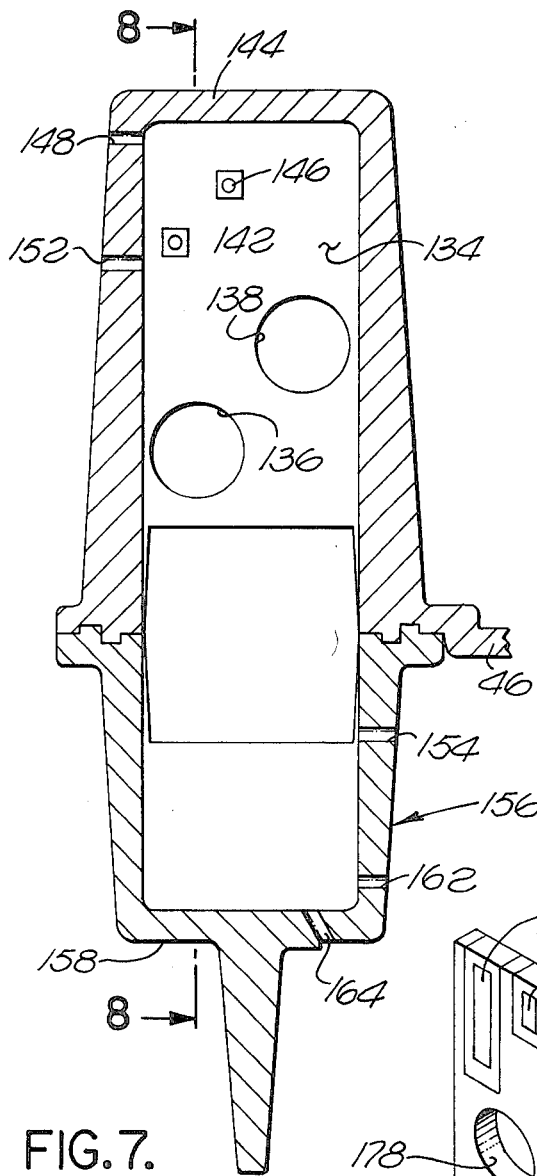
FIG. 7 is a cross-sectional view of a portion of the delay chamber of the engine.

Referring now to FIG. 7, the housing of the valve leading into the combustion/exhaust chamber 14, 16 or 18 is shown in greater detail and comprises a wall 134 formed in a plane perpendicular to the axis of travel of the rotor 56. A lower communicating opening 136 and an upper communicating opening 138 are vertically offset from each other in the plane of the wall 134 above the annular chamber 54. A secondary spark coil contact 142 is positioned above the lower communicating open- 26 from the upper intermediate annular cavity 228. The apertures in the distribution cylinder 38 are vented to atmosphere through the first cylinder compartment 304 to relieve back pressure in the system. Once firing of the motor has commenced, the handle 234 is rotated until the intermediate rotatable cylinder 32 once again is in the normal operating position.

While the engine has been described as providing a compressed air output, it should be understood that direct connection could be made to the rotor 56 along the interior surface of the housing. Thus, the rotor rotation could be used to drive a shaft or other member as it rotates.

Although the distance traveled by a rotor enlarged height section 102 from a combustion/exhaust chamber to an adjacent compression/intake chamber, and hence to the next combustion/exhaust chamber is equal, these relative distances may be altered to give any desired combination of air intake compression, for combustion carried to completion, and for expansion carried to atmospheric pressure and temperature, so as not to waste pressure or heat and minimize sound emission.

Air can be compressed as shown both for mixing with fuel for combustion and for storing for propulsion or other use as needed. This can be accomplished jointly as shown or separately in additional cylinder chambers for the intake and compression of air or other fluid (gas or liquid).

Turning now to FIG. 11, the rotor is shown in the cylinder housing as it passes through three successive valves. On the extreme left is shown part of a compression-intake chamber through which an enlarged height section 106 has just passed and force compressed air out through a one-way valve 214. The section 106 is now centered between fully open valve members 172 and 174 with port 176 open between dual ports 138, allowing compressed air-fuel mixture to flow from chamber 202 into metering and delay chamber 204. Next to the right is shown one of the combustion-exhaust chambers, now filled with the fully expanded and cool product of the preceding combustion. Moving to the right in the direction of the rotor rotation, at the end of combustion chamber, a pair of valve members 174 are shown just beyond exhaust port 220 in the lower cylinder housing and just before the air intake chamber 213 above port 211. The next maximum height section 106 is illustrated 12° into a compression-intake chamber, compressing air ahead of it, and drawing air through port 211, through pipe 232 from control valve cavity 228. The valve through which the second enlarged height section 106 has just passed is closing and the third valve is fully closed. The third enlarged height section is being driven by a completed combustion, port 176 is closed, port 178 is aligned with dual ports 136 connecting the delay chamber 204 with ignition chamber 206 and products of the preceding combustion are exhausted ahead of the maximum height section.

I claim:

1. An engine comprising: an annual cylinder of uniform cross-section forming a cylinder housing;
   a rotor positioned in and movable in said cylinder housing, having a width approximately equal to the width of said housing and having a plurality of uniform thickness height sections which are interconnected by at least one enlarged height section;
   a plurality of valve members in said cylinder housing each valve member being movable when an enlarged height section passes adjacent thereto;
   said valve members being movable in chambers formed in said engine, at least one of said chambers forming a combustion-exhaust chamber and another of said chambers forming a compression-intake chamber and means for supplying an air fuel mixture coupled to said compression-intake chamber;
   said valve members in each of said combustion-exhaust chambers have a pair of openings therein, a delay section formed in said combustion-exhaust chamber, one of said openings being movable by said piston enlarged height section and forming a path for enabling an air-fuel mixture to enter said delay section of said combustion chamber, and a second opening in said valve member being movable and forming a path for enabling said air-fuel mixture to pass from said delay section to an ignition section of said combustion-exhaust chamber, and ignition means formed in said combustion-exhaust chamber for igniting said air-fuel mixture;
   means for introducing a source of fluid into said cylinder; and
   means for exhausting said fluid in a compressed form from said cylinder.

2. A rotary engine in accordance with claim 1 wherein said compression-intake chamber contains a valve member forming a compressed air outlet passageway from said compression-intake chamber.

3. An engine in accordance with claim 2 wherein said compression-intake chamber contains an air intake for enabling fresh air to enter said cylinder housing and be compressed therein; a compressed air source; said valve member forming means for coupling said compressed air formed in said cylinder housing to be directed to said compressed air source.

4. A rotary engine in accordance with claim 1 wherein said ignition means includes primary and secondary spark coil circuits, a portion of said circuits being formed on said movable valve member wherein movement by said piston enlarged height section makes and breaks said primary and secondary spark coil circuits for igniting said air-fuel mix as it enters the ignition section of said combustion-exhaust chamber.

5. An engine comprising:
   an annular cylinder of uniform cross-section forming a cylinder housing;
   a rotor positioned in and movable in said cylinder housing, having a width approximately equal to the width of said housing and having at least one uniform thickness height section which is interconnected to at least one enlarged height section, forming a piston;
   valve members in said cylinder housing, said valve members being movable when a piston passes adjacent thereto,
   chambers formed in said engine, at least one of said chambers forming a combustion-exhaust chamber having a delay section therein, and another of said chambers forming a compression-intake chamber; and
   a valve member in said combustion-exhaust chamber having a pair of openings therein, said openings being movable by said piston enlarged height section, one opening for enabling an air-fuel mixture to enter said delay section through an aligned opening of said combustion-exhaust chamber, and a second opening in said valve member forming a path for enabling said air-fuel mixture to pass from said ing 136 intermediate the chamber top wall 144 and the upper communicating opening 138. A primary contact 146 is vertically offset from the secondary spark coil contact 142 and positioned in a plane intermediate the top wall 144 and the secondary spark plug contact 142. A compressed air inlet opening 148 is formed in the wall of the housing adjacent the housing top wall 144 and an oil inlet 152 is formed in the housing side wall adjacent the secondary spark coil contact 142.

A lower valve oil inlet 154 is formed in the bottom half 156 of the chamber adjacent to the lower surface of the annular cavity 54. A compressed air inlet 162 is formed adjacent the valve housing lower wall 158 and an opening 164 in the housing lower wall forms an oil drain outlet.

Figure 8:
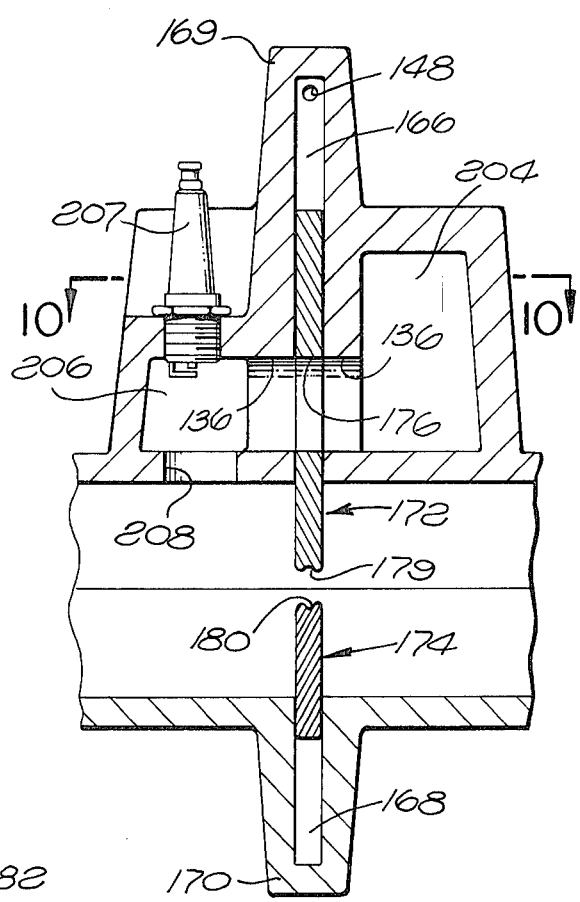
FIG. 8 is a side view, partly in section, of the delayed combustion chamber of FIG. 7 taken along the line 8—8 thereof.
Figure 9:
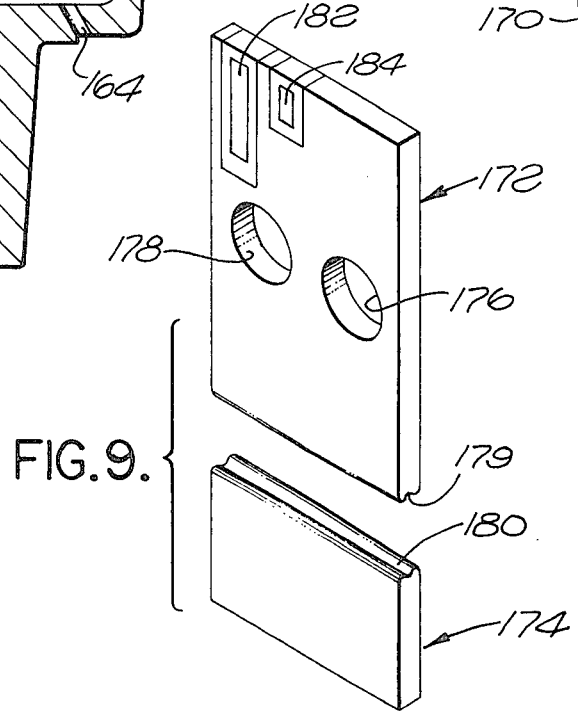
FIG. 9 is a perspective view of the upper and lower valve elements used in the combustion chamber of FIGS. 7 and 8.

Referring now to FIG. 8, the valve elements are illustrated in cross-sectional view positioned in an upper channel 166 and a lower channel 168 formed in the valve housing 169 and 170, respectively. The valve elements are illustrated in perspective view in FIG. 9 and comprise an upper valve element 172 movable in the upper valve channel 166 and a lower valve element 174 movable in the lower valve channel 168. The upper element 172 is generally an enlarged rectangular configuration as compared to the lower valve element 174. The adjacent facing surfaces 179 and 180 of the valves 172 and 174, respectively, are slightly rippled to form a double seal against the rotor 56 as it travels in the annular cavity 54.

The compressed air inlet openings 148 and 162 tend to keep the valve elements 172 and 174, respectively, adjacent the surfaces of the rotor during its travels through the annular cavity 54. The valve element 172 contains an inlet opening 176 and an outlet opening 178 positioned in a central common transverse plane. The element 176 communicates with the upper communicating opening 138 when the rotor 56 maximum height point 106 passes adjacent the valve 172 and the outlet opening 178 communicates with the lower communicating opening 136 when the rotor minimum height points 104 and 108 are passing adjacent the valve 172 as will be explainted hereinafter.

An enlarged length gap electrode 182 and a reduced length gap electrode 184 are positioned directly above the outlet opening 178 and in vertically extending planes common to the vertical plane of the secondary spark coil contact 142 and the primary contact 146, respectively. The gap electrodes extend downwardly from near the top wall of the valve element 172 with the enlarged length gap electrode 182 extending approximately twice the length of the reduced gap electrode 184.

Referring again to FIG. 10, the compressed airfuel mixture feedline 132 is coupled into the inlet chamber 202 through an opening 133. When the rotor 56 main height point 106 reaches the plane of the upper and lower valve elements 172 and 174, the lower valve element 174 is forced into the lower valve channel 168 (FIG. 8). Simultaneously, the upper valve element 172 is forced into the upper valve channel 166. The inlet opening 176 at this time communicates with the upper communicating opening 138 in the valve housing wall 134, enablinhg the air-fuel mixture in the inlet chamber 202 to pass into a delay chamber 204.

The intake of atmospheric air into compression intake chambers 22, 24 and 26 is from the control valve first cylinder compartment 304 (FIG. 1), through apertures (not shown) to upper intermediate chamber 228 of distribution chamber 38 (FIG. 2), then to pipe 232, to chamber 213 and port 211 (FIG. 11).

After the rotor 56 maximum height point passes the upper valve element 172, the upper valve element 172 drops to its position shown in FIG. 8 and the air-fuel mixture in the delay chamber 204 is transferred through the valve outlet opening 178 into an ignition chamber 206. During the movement of the upper valve element to the position in FIG. 8, the primary contact 146 separates from the reduced length gap electrode 184 and a high voltage is placed across the secondary spark coil contact 142 and the enlarged length gap electrode 182. At approximately this time, the spark plug 207 in the ignition chamber 206 starts to fire and firing of the plug is completed before the secondary contact 142 and the enlarged length gap electrode 182 separate. The ignition chamber 206 contains an outlet port 208 through which combustible gases can pass into the annular cavity 54. The combustion/exhaust chambers 14, 16, 18 each contain an outlet 220 through which spent gases traveling ahead of the rotor maximum height point 106 are exhausted.

The compression/intake chambers 22, 24, and 26 each also contain a compressed air outlet chamber 212 shown in FIG. 2 which communicates with the annular cavity 54 through a port 214 formed in the chamber wall 58. The port 214 contains a one-way valve. Air is compressed in front of the maximum height point 106 as the rotor nears the valve elements 172 and 174 and the port 214 one-way valve opens enabling the compressed air to enter the compressed air outlet chamber 212. The chamber 212 in turn is connected through a compressed air outlet pipe 216 to a lower intermediate annular cavity 218 of the distribution cylinder 38. The lower intermediate cavity 218 in turn communicates through apertures 222 and second cylinder compartment 306 to the compressed air pipe 44. The compressed air in the air pipe 44 in turn is coupled through an aperture 224 to the upper annular cavity 226 of the distribution cylinder 38. The upper annular cavity 226 in turn couples the compressed air to the external outlet 28.

Compression/intake chambers 22, 24 and 26 contain upper valve elements similar to the lower valve element 174 (FIG. 8). The compression/intake chamber lower valve elements are the same as the lower valve elements 174.

Atmospheric air from the upper and lower fresh air inlets 34 and 52, respectively, are coupled from the interior of the first compartment 304 through apertures (not shown) to the upper intermediate cavity 228 of the distribution cylinder 38. The atmospheric air is then transferred through pipes 232 (FIG. 1) to the compression chambers where the air enters the annular cavity 54 and is compressed as previously explained.

To stop the engine rotor movement, the intermediate rotatable cylinder 32 is rotated. Rotation is performed by means of an operating handle 234 (FIG. 2) which moves with the intermediate rotatable cylinder 32 until all apertures between the cylindrical distribution cylinder 38 and the inner fixed cylinder 30 are blocked, preventing air-fuel mixtures from entering the combustion chambers.

To start the motor, the operating handle 234 is moved wherein compressed air is fed to the carburetor from the storage container 29 connected to the compressed air pipe 44 and the external outlet 28, as during normal operation of the engine. In addition, compressed air is also fed to the compression/intake chambers 22, 24 and delay section to an ignition section through a second aligned opening of said combustion-exhaust chamber wherein said air-fuel mixture is ignited, one of said valve member openings aligning with an aligned opening in the combustion-exhaust chamber in one postion only, said other opening in the valve member aligning with said other aligned opening in a second position only for properly effecting desired valving action.

6. A rotary engine in accordance with claim 5 wherein means are provided for directing a compressed air source towards said engine for enabling said engine to be started.

7. A rotary engine in accordance with claim 5, wherein a directing means is provided which comprises multiple concentric cylindrical distribution chambers, relatively rotatable for starting, running and stopping of said engine.

8. A rotary engine in accordance with claim 5 wherein said rotor is formed of an annular ring which floats on an air bed during movement and wherein said valve members are movable by said rotor in a plane perpendicular to the plane of movement of said piston.

9. An engine in accordance with claim 8 wherein said valve members each have a surface forming a seal with said rotor.

* * * * *